United States Patent
van de Waerdt

(10) Patent No.: US 6,678,792 B2
(45) Date of Patent: Jan. 13, 2004

(54) FAST AND ACCURATE CACHE WAY SELECTION

(75) Inventor: Jan-Willem van de Waerdt, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 171 days.

(21) Appl. No.: 09/887,463

(22) Filed: Jun. 22, 2001

(65) Prior Publication Data

US 2003/0014597 A1 Jan. 16, 2003

(51) Int. Cl.$^7$ .............................................. G06F 12/08
(52) U.S. Cl. ........................................................ 711/128
(58) Field of Search ........................................ 711/128

(56) References Cited

U.S. PATENT DOCUMENTS 5,845,323 A * 12/1998 Roberts et al. ............. 711/128

FOREIGN PATENT DOCUMENTS

EP 0752662 A 1/1997

OTHER PUBLICATIONS

Inoue, Koji and Ishihara, Tohru; A High–Performance and Low–Power Cache Architecture with Speculative Way–Selection; IEICE Trans. Electron, vol. E83–C, No. 2, Feb. 2000, pp 186–194.

* cited by examiner

Primary Examiner—Reginald G. Bragdon
Assistant Examiner—Midys Inoa
(74) Attorney, Agent, or Firm—Michael Schmitt

(57) ABSTRACT

A way-determination scheme for an n-way associative cache is provided that is based on the entirety of the line address of a requested data item, thereby eliminating the possibility of a mis-identification of the way that contains the requested data item. A limited number of line addresses, and their assigned ways, are stored in a Way Determination Table. If a requested data address corresponds to one of these line addresses, the assigned way is provided; if not, a 'null' response is provided, indicating that the way is not known for this data address. If an assigned way is provided, the way corresponding to this assigned way is accessed, with the assurance that the accessed way contains the requested data item. If a 'null' response is provided, the n-ways are accessed to determine whether the requested data line is in the cache, as in a conventional n-way associative cache. A 'predicted' way is not provided, thereby eliminating the need to accommodate the possibility of a mis-prediction or mis-speculation. A content-based access is used to determine whether a requested data address has an assigned way, thereby providing for a rapid determination of whether a selective way access can be used, or an n-way access is required.

20 Claims, 2 Drawing Sheets

FIG. 1 [Prior Art]

FAST AND ACCURATE CACHE WAY SELECTION

BACKGROUND OF THE INVENTION

1. Field of the Invention

This invention relates to the field of computer systems, and in particular to an n-way associative cache that uses a deterministic way selection.

2. Description of Related Art

Cache systems are commonly used to reduce the effective delay associated with access to relatively slow memory devices. When a processor requests access to a particular data item in the slower memory, the cache system loads the requested data item into a higher speed memory. Thereafter, subsequent accesses to this same data item are provided via the higher speed memory, thereby avoiding the delay associated with the slower memory. Generally, a "line" of data items that contains the requested data item is loaded from the slower memory into the higher speed memory when the data item is requested, so that any data item within the loaded line can be subsequently provided by the higher speed memory.

The effectiveness of a cache memory access system is provided by the likelihood that future data accesses are related to prior data accesses. Generally, the likelihood of a requested data item being contained in the same line of cache as a prior requested data item is substantially higher than zero, and therefore the likelihood of satisfying the request from the higher speed cache memory is correspondingly substantially higher than zero.

Higher speed memory is more costly than slower speed memory, and therefore the amount of available cache memory is generally limited. Cache management schemes are used to determine which data items to remove from the higher speed memory when a new line of data needs to be loaded into the higher speed memory. A commonly used prioritization scheme for retaining data items in the higher speed memory is a "least recently used" (LRU) criteria, wherein the line of the least recently used (i.e. "older") memory access is replaced by the new line, thereby retaining recently used/accessed data items. Other criteria, such as "most often used", may also be used, typically in conjunction with the LRU prioritization scheme.

Associative caches are commonly used to store lines of data items based upon a subset of the address of the requested item. FIG. 1 illustrates a conventional addressing scheme for an associative cache system 100. An address 110, typically from a processor 180, and discussed further below, is logically partitioned into a tag field 111, an index field 112, and a word field 113. The index field 112 provides an index to an associated set of cache lines in a cache memory 120. Each cache line of the set corresponds to a "way", or "section" of the memory 120, and the cache memory 120 is termed an "n-way associative cache". The size of the word field 113, j, corresponds to the size of a data line, $2^j$. That is, if there are sixteen words per data line, then the size of the word field 113 will be four-bits; if there are sixty four words per data line, then the word field 113 will be six-bits wide. Using this power-of-two relationship between the word field 113 and the size of the data line, the tag and index fields uniquely identify each data line in the memory.

When an addressed data item is loaded into the cache memory 120 from a slower memory (not shown), the line of data containing the data item is placed in a select way, the index field defining the location in the selected way for placing the data line. The selection of the way is effected using one of a variety of commonly available algorithms, such as the aforementioned LRU prioritization scheme. When the addressed data item is stored in a particular line area DLine-a, DLine-b, etc. in the cache 120, the tag field 111 is also stored, as illustrated by fields Tag-a 121a, Tag-b 121b, etc. in FIG. 1. The stored tag field 121, in combination with the data line's location within the way, corresponding to the data line's index field 112, uniquely identifies the data line that is stored in the cache 120.

Before an addressed data item is loaded into the cache 120, the cache 120 is checked to determine whether the data item is already located in the cache 120, to potentially avoid having to load the data item from the slower memory. The addressed data item may be located in the cache due to a prior access to this data item, or, due to a prior access to a data item within the same line of data DLine-a, DLine-b, etc. as the currently addressed data item. The index field 112 defines the set of n-lines in the cache 120 that are associated with this address. Each of the stored tags 121a, 121b, etc. corresponding to each of the stored lines 125a, 125b, etc. in the associated set is compared to the tag field 111 of the addressed data item, via the comparators 130a, 130b, etc. While this comparison is being made, each of the stored data lines 125a, 125b, etc. corresponding to the index field 113 are loaded into a high-speed buffer 140, so as to be available if the data item is currently loaded in the cache 120.

If the addressed data item is currently loaded in one of the ways 120a, 120b, etc. of the cache 120, the corresponding comparator 130a, 130b, etc. asserts a cache-hit signal, thereby identifying the particular way Hit-a, Hit-b, etc. that contains the data line. If a hit is asserted, the appropriate word is retrieved from the corresponding buffer 140, using the word field 113 to select the appropriate word 141a, 141b, etc. from the data line contained in the buffer 140. The retrieved word is forwarded to the processor 180 that provided the address 110. In a conventional embodiment of the cache system 100, the time required to effect the comparison of the tag field 111 to the stored tag fields 121a, 121b, etc., and the subsequent selection of the appropriate word 141a, 141b, etc. when a cache-hit occurs, is substantially less than the delay time corresponding to the slower memory. In this manner, the effective access time to a data item is substantially reduced when the data item is located in the cache 120.

If a cache-hit does not occur, the above described load of the addressed data line from memory into a select way, Way-a 120a, Way-b 120b, etc., of the cache 120 is effected, typically by loading the data line into the least recently used (LRU) way, or other prioritization scheme, as mentioned above.

The time required to store words, effectively from the processor 180 to the memory, is similarly accelerated via use of the cache system 100. The presence of the addressed data item in the cache 120 is determined, using the above described comparison process. If the data item is currently located in the cache 120, the new value of the data item from the processor 180 replaces the select word, or words, of the buffer 140, and the buffer 140 is loaded into the data line 125a, 125b, etc. containing the addressed data item. The "modified" field 129 is used to signal that the contents of a cached line have changed. Before a data line is overwritten by a new data line, the modified field 129 is checked, and, if the data line has been modified, the modified data line is stored back into the memory, using the stored tag field 121a, 121b, etc. to identify the location in memory to store the line.

Although an n-way associative cache provides an effective means for increasing the effective memory access speed, the simultaneous way-comparison scheme, wherein the tag of the addressed data item is compared to all of the stored tags, consumes energy at a rate that is n-times higher than a one-way associative cache. It is not uncommon for n-way associative caches to be substantially hotter than other areas of an integrated circuit, or printed circuit boards.

To reduce the power consumption of a conventional n-way associative cache, predictive techniques are applied to select a likely way corresponding to a given address. In a conventional embodiment of a way prediction scheme, the likely way is first checked for the addressed data item, and only if that way does not contain the addressed data item, are the remaining ways checked. "A HIGH-PERFORMANCE AND LOW-POWER CACHE ARCHITECTURE WITH SPECULATIVE WAY-SELECTION", by Koji Inoue et al, published in IEICE Trans. Electron., Vol. E83-C, No. 2, February 2000, pages 186–194, and incorporated by reference herein, presents a way-prediction scheme, and a comparison of the energy consumption by a way-prediction scheme to non-predictive schemes. If the prediction success rate is high, the energy savings can be quite substantial, because a reduction in energy by a factor of n is achieved each time the way-prediction is correct.

Illustrated in FIG. 1 is an example way prediction table 150 that is used to predict the particular way 120a, 120b, etc. that is associated with an addressed data item. A subset 115 of the data address 110 is used to index the way-prediction table 150, as indicated by the dashed lines in FIG. 1. A variety of schemes may be used to define this subset 115 of the address 110, and to define the algorithm used to provide the contents of the way-prediction table 150. A straightforward embodiment uses the index field 113 as the subset 115 that is used to index the 47 table 150, and the contents of the table 150 correspond to the least recently used (LRU) way, Way-a 120a, Way-b 120b, etc., for each index 113. Alternatively, a subset 115 of the index field 112, or a subset 115 taken from both the tag 111 and the index 112 fields may also be used to provide an index to the way-prediction table 150. The choice of the subset 115 of the address 110 used to index the way-prediction table, and the number, n, of ways, determines the size of the required way-prediction table. In an 8-way associative cache, three bits are required to uniquely identify each of the ways in the way-prediction table, and the number of three-bit entries in the table 150 is determined by the number of unique combinations of the subset 115 of the address used to index the table 150. If ten bits (i=10) are used as the subset 115 to index the table 150, for example, 1024 ($2^i$) three-bit entries must be supported in the table 150. Note that the length of the table 150 ($2^i$) is substantially smaller than the number of addressable lines ($2^{M-w}$, where M is the number of bits in the address (typically, 16, 32, or 64), and w is the number of bits, typically 2 to 5, corresponding to the number of words per line, typically 4, 8, 16, or 32). That is, the index to the table 150 is a proper subset 115 of the tag 111 and index 112 fields.

When an address 110 is requested, the predicted way from the way-prediction table 150 is used to selectively access only the predicted way. All addresses have a corresponding predicted way, but, because the index to the table 150 is a subset of the number of addressable lines, different addresses 110 may each point to the same entry in the table 150. Only one of these different addresses may actually correspond to the data that is stored in the way that is indicated by the content of the table 150 at any given time, hence the term "predicted" way.

For convenience, the subscript p is used hereinafter to designate the predicted way. The stored tag 121p corresponding to the index field 112 in the selected way 120p is provided to the comparator 130p of the selected way 120p, and the corresponding data line 125p is provided to the buffer 140p of the selected way 120p. The Hit-p signal is asserted if the predicted way 120p contains the data line, and the addressed word is provided to the requesting processor 180 from the buffer 140p. If the predicted way 120p does not contain the addressed data item, each of the other, non-predicted, ways are checked for the presence of the addressed data item, using the techniques discussed above for checking an n-way associative cache for an addressed data item.

If none of the ways contains the addressed data item, the data line that contains the addressed data item is loaded from the memory into the cache 120, typically into the least recently used way at the index position. Assuming that the way-prediction table 150 is configured to store the most recently used way, an identification of the way that was used to store the data line is stored into the way prediction table 150. In this manner, a subsequent request for a data item in the same data line as the currently addressed data item will produce the correct predicted way, and thereby save power consumption.

Variations on this power-saving scheme may also be used. For example, all of the tags 121a, 121b, etc. may be loaded into the corresponding comparator 130a, 130b, etc., but only the data line 125p of the predicted way 120p may be loaded into the buffer 140p. In this manner, some power savings are achieved by avoiding the loading of all of the data lines 125a, 125b, etc. of the non-predicted ways into the buffers 140a, 140b, etc., while also avoiding the time required to recheck all of the tag fields 121a, 121b, etc. when the predicted way does not contain the addressed data item. If one of the other tag comparators 130 asserts a hit signal, the data line 125 of the corresponding way is loaded into the corresponding buffer 140, and the appropriate word is provided to the processor 180. If none of the other tag comparators 130 assert a hit signal, the addressed data line is loaded from memory into the cache 120, as discussed above.

Note that in a conventional way-prediction scheme as illustrated in FIG. 1, an incorrect way prediction necessitates a reliable means of "canceling" the access to the data line in the mis-predicted way, and other effects of this mis-prediction. Generally, a way-prediction scheme is used in a pipelined architecture, wherein the memory access is initiated prior to the time that the value from the memory is required. The determination of whether the predicted way contains the addressed data item, and the subsequent determination of whether any of the ways contain the addressed data item, is time consuming, and therefore a cache-miss is not immediately determinable. During the time that the cache-hit or cache-miss is being determined, the pipelined process typically effects actions in anticipation of a cache-hit, so as to take advantage of the speed gains provided by a cache-hit. When a cache-miss occurs, some or all of the effects of the cache-hit anticipatory actions must be cancelled. The circuitry and timing constraints required to effect a reliable cancellation of a mis-prediction can be fairly complex. However, the power savings that are achievable by a way-prediction scheme, and the speed gains that are achievable by a high occurrence of cache-hits, generally offset the additional design and production costs associated with the addition of this complex circuitry.

BRIEF SUMMARY OF THE INVENTION

It is an object of this invention to provide a method and system that allows a deterministic way-identification. It is a further object of this invention to provide a method and system that eliminates the need to handle way mis-predictions. It is a further object of this invention to provide a way-determination scheme that is less complex than conventional way-prediction schemes that require mis-prediction cancellation processes. It is a further object of this invention to provide a way-identification scheme that provides an immediate determination of whether an addressed data item is known to be in a way of the cache.

These objects, and others, are achieved by providing a way-determination scheme for an n-way associative cache that is based on the entirety of the line address of the requested data item, thereby eliminating the possibility of a mis-identification of the way that contains the requested data item. A limited number of line addresses, and their assigned ways, are stored in a Way Determination Table. If a requested data address corresponds to one of these line addresses, the assigned way is provided; if not, a 'null' response is provided, indicating that the way is not known for this data address. If an assigned way is provided, the way corresponding to this assigned way is accessed, with the assurance that the accessed way contains the requested data item. If a 'null' response is provided, the n-ways are accessed to determine whether the requested data line is in the cache, as in a conventional n-way associative cache. A 'predicted' way is not provided, thereby eliminating the need to accommodate the possibility of a mis-prediction or mis-speculation. A content-based access is used to determine whether a requested data address has an assigned way, thereby providing for a rapid determination of whether a selective way access can be used, or an n-way access is required.

BRIEF DESCRIPTION OF THE DRAWINGS

The invention is explained in further detail, and by way of example, with reference to the accompanying drawings wherein.

Figure 1:
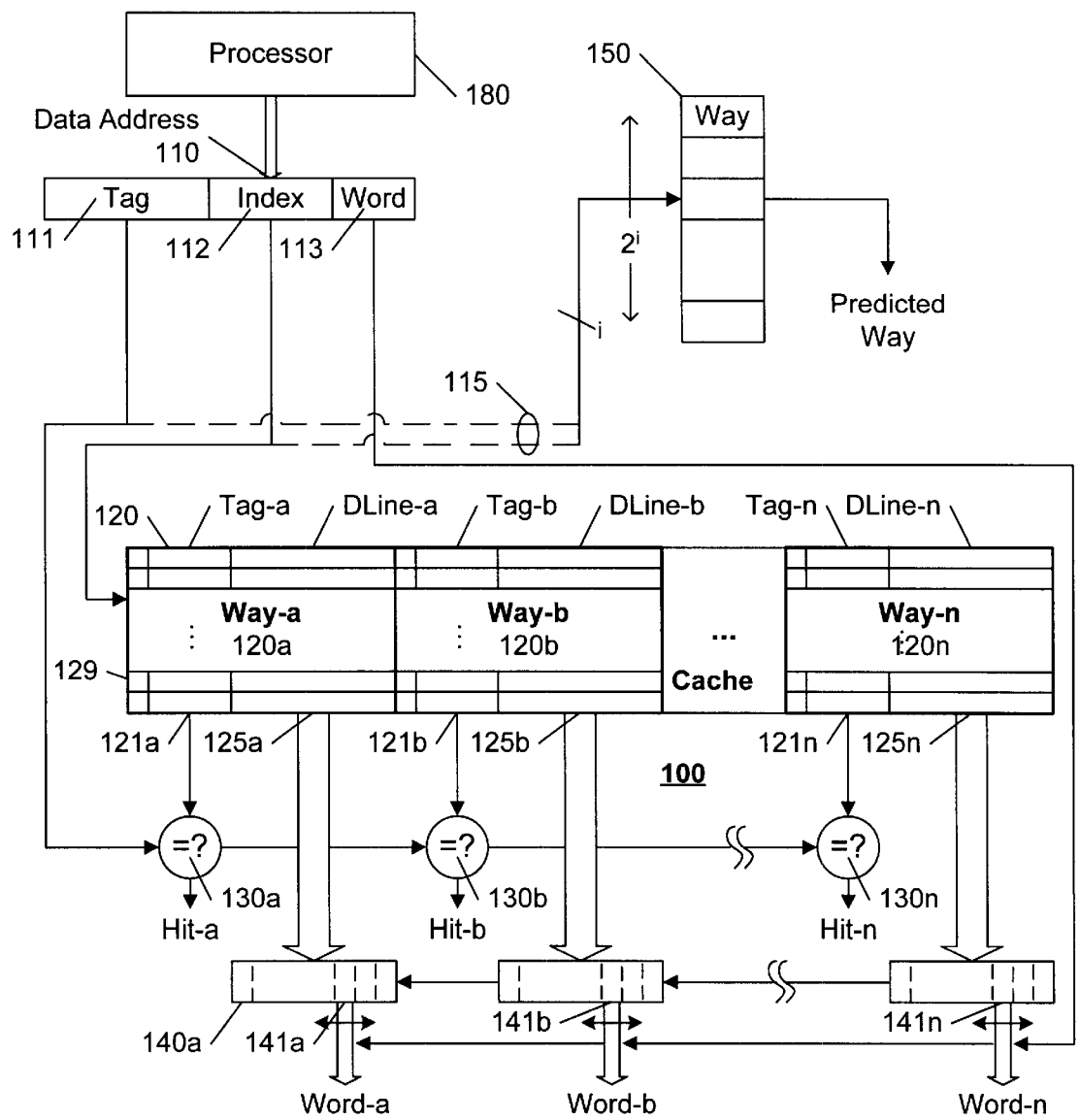
FIG. 1 illustrates an example block diagram of a prior art n-way associative cache with way-prediction.

Throughout the drawings, the same reference numerals indicate similar or corresponding features or functions. Items with suffix letters indicate particular examples of a common feature or function. References in the specification to such items without a particular suffix letter indicate any or all of the illustrated items having the same numeric reference.

DETAILED DESCRIPTION OF THE INVENTION

Figure 2:
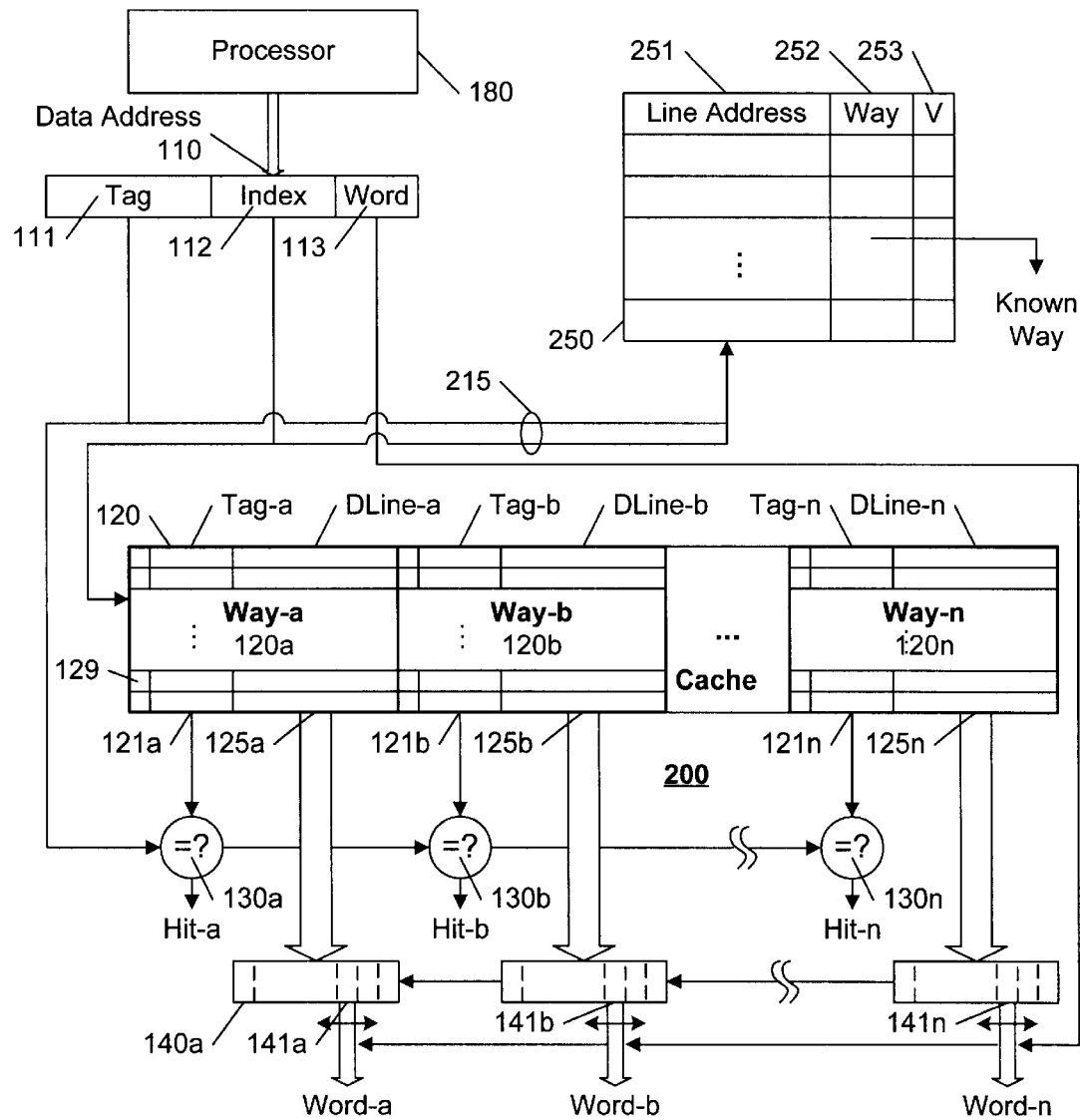
FIG. 2 illustrates an example block diagram of an n-way associative cache with way-determination in accordance with this invention.

FIG. 2 illustrates an example block diagram of an n-way associative cache system 200 with way-determination in accordance with this invention. A way-determination table 250 is provided that maps a limited number of line addresses 251 to assigned ways 252. Each line address 251 uniquely and unambiguously identifies a line of data, DLine 125, and the assigned way 252 uniquely and unambiguously identifies the way, Way-a 120a, Way-b 120b, etc., that contains the line of data 125. That is, if the address space of addressable words in the slower memory is $2^M$, and the number of words per line is $2^w$, there will be $2^M/2^w(2^{M-w})$ uniquely addressable lines. Thus, in this example, the line address 251 is M−w bits wide, and corresponds to the tag 111 and index 112 fields of the data address 110.

In accordance with this invention, because each line address 251 uniquely identifies a line of data, and each assigned way 252 uniquely identifies each way, there is no ambiguity concerning whether or not the way 120a, 120b, etc. corresponding to the assigned way 252 contains the addressed line. In the conventional way-prediction scheme of FIG. 1, on the other hand, because multiple line addresses (combinations of tag 111 and index 112) provide the same index to the predictive way table 150, there is always an uncertainty regarding whether the predicted way 120p actually contains the currently addressed line.

When a data address 110 is received, the way-determination table 250 is checked to determine whether the data line corresponding to the data address 110 is known to be stored in an assigned way 252. If the addressed data line 215, corresponding to the tag 111 and index 112 fields of the data address 110, is contained within the way-determination table 250, the assigned way 252 corresponding to this addressed data line 215 is provided, as the known way that contains this data line 215. For convenience, the letter k is used to indicate the provided known way from the way-determination table 250. If the addressed data line 215 is not contained within the way-determination table 250, a 'null', or 'failed' response is provided.

In a preferred embodiment, the way-determination table 250 comprises a content-addressable memory (CAM) structure, common in the art, to provide an immediate indication of whether the addressed data line 215 is one of the line addresses 251 that are contained in the table 250.

If a known way, k, is provided, the data line 125k from the way 120k is accessed, and the Hit-k signal is asserted. If a 'null' response is provided, the plurality of ways 120a, 120b, etc. are accessed to determine whether the data line is located within any of the ways of the cache 120, as in a conventional n-way associative cache system.

As compared to the conventional predictive-cache system of FIG. 1, because the assigned way 252 is assigned to each line address 251 uniquely, capabilities need not be provided to accommodate a potential mis-determination (mis-prediction) of the known way from the way-determination table 250. As also compared to the conventional predictive-cache system of FIG. 1, however, only a limited number of data addresses will have line addresses 215 that have a corresponding entry 251 in the way-determination table 250. In a conventional predictive cache system, all data addresses will provide an index 115 into the way-prediction table 150. That is, the way-determination system 200 of this invention provides an accurate way-determination for a limited number of data addresses, whereas the conventional way-prediction system 100 provides a potentially inaccurate way-prediction for any and all data addresses.

A variety of techniques may be employed to determine which line addresses 251 are contained in the way-determination table 250. For example, line addresses corresponding to particular data items or data types may be stored in the table 250. In a preferred embodiment of this invention, to minimize design complexity, an MRU (most recently used) algorithm is used to load the table 250 with the N most recently accessed line addresses 215, where N is the length of the table 250. If an addressed data line 215 is found not to be located in the way-determination table 250, the cache system 200 will either find the data line in one of the ways of the cache 120, or will load the data line from the slower memory into one of the ways of the cache 120, as in a conventional n-way cache. The address 215 of the data line, and the identification of the found or loaded way that now contains the data line are stored in the table 250, as the line address 251 and assigned way 252, respectively. Thereafter, subsequent accesses to this data line will result in a known way, k, being provided, until this entry in the table 250 is replaced by the line address and way of a more recently used data line. Consistent with the MRU algorithm, each new entry in the table 250 replaces the least recently used entry in the table 250.

A 'valid' field 253 is also included in the cache table 250, to provide for an 'invalidation' of an entry. When the cache system adds a data line to the cache, it replaces a prior stored data line. If this prior stored data line corresponds to an entry in the table 250, the entry is invalidated, by an appropriate marking of the valid field 253. The invalidation of an entry in the table 250 can be expected to be a rare occurrence, because the number of data lines in the cache 120 will generally be greater than the number of entries in the table 250, and the common replacement policy of a cache system 200 is to replace the least recently used data line, whereas the table 250 is configured to store the line address of the most recently used data lines. In a preferred embodiment of this invention, the aforementioned MRU algorithm is modified to use any invalidated entry as the preferred location for adding new entries, thereby minimizing the number of invalidated entries in the table 250.

The number N of line addresses contained in the table 250 determines the likelihood of providing a known way for a data access. The number n of data items per data line also affects the likelihood of providing a known way, because adjacent data items are likely to be accessed within a common time span. The number n of data items per data line is typically determined based on overall cache design parameters, and typically corresponds to 8, 16, or 32 words per data line. Because each entry in the table 250 requires M–w bits for containing the line address 251, plus four to six bits to contain the assigned way 252 and valid field 253, the relative cost of each entry in the preferred content-addressable table 250 is not insignificant. In a preferred embodiment, as few as four entries in the table 250 has been found to provide an average hit rate of more than 50%, using conventional bench-mark tests. That is, with a table 250 that is configured to store the four most recently accessed data lines, a known way was provided for at least half of the data accesses, with as few as eight words per data line. In the case of 32 words per data line, the average hit rate with four entries in the table 250 was above 70%; and with eight entries, was above 80%.

Alternatives to the example embodiment of FIG. 2 will be evident to one of ordinary skill in the art in view of this disclosure. For example, the spatial locality of cache accesses can be exploited by providing a way-determination table that is accessible via a group identification of spatially related cache lines. The following table illustrates this concept, wherein the example groups comprise four lines. Each group address entry is followed by a set of way-valid pairs, wherein the way entry identifies the particular way that contains the corresponding line within the group, and whether that way entry is currently valid. In the example table, the first line (Line00) of the first group address is located in way A, and is currently valid, whereas the second line of the first group address is indicated as being located in way C, but this entry is marked as invalid. In accordance with this invention, a reference to a data item within the first line of the first group will return a "known way" value of A, and a reference to a data item within the second line of the first group will return a "failed" value. In a preferred embodiment, the group address is the most-significant bits of the line addresses that are common to the group. That is, if the line address is N bits wide, and the group includes four lines, the group address is the most-significant N-2 bits of the address. When a data item is addressed, the N-2 most significant bits of the data item's address provides the group address, and the next two bits determine which pair of "way-valid" entries in the table corresponds to the addressed line. In like manner, a grouping of eight lines would correspond to a group address of the N-3 most significant bits, and the next three bits will determine which "way-valid" pair corresponds to the particular addressed way.

|  | Line00 |  | Line01 |  | Line10 |  | Line11 |  |
| --- | --- | --- | --- | --- | --- | --- | --- | --- |
| Group Address | Way | V | Way | V | Way | V | Way | V |
| Address 1 | A | Y | C | N | G | Y | B | Y |
| Address 2 | C | Y | C | Y | A | N | D | Y |
| ... | | | | | | | | |

The foregoing merely illustrates the principles of the invention. It will thus be appreciated that those skilled in the art will be able to devise various arrangements which, although not explicitly described or shown herein, embody the principles of the invention and are thus within its spirit and scope. For example, if design complexity is not a concern, this invention can be used to augment, rather than replace, a convention way-prediction scheme. In such an embodiment, for example, if a known way is not found, a predicted way can be assessed before assessing the entirety of the ways in the cache. Also, the particular partitioning of functions in the figures is provided for illustrative purposes. The cache system, for example, could be wholly or partially contained within the processor, or within a memory management system that includes the slower memory, and so on. Additionally, some or all of the functions illustrated may be embodied as hardware, software, or firmware blocks. These and other system configuration and optimization features will be evident to one of ordinary skill in the art in view of this disclosure, and are included within the scope of the following claims.

I claim:

1. A cache system comprising:
    a cache memory comprising a plurality of sections,
        each section of the plurality of sections comprising a plurality of stored data lines, and
    a way determination table that is configured to contain a limited number of address entries corresponding to addresses of the stored data lines and an assigned section for each of the addresses of the stored data lines;
    wherein
        the assigned section of each of the addresses of the stored data lines uniquely and unambiguously identifies the section of the cache memory that contains the stored data line, and
        the cache system is configured
            to determine, without a tag comparison operation, whether an addressed data item is located in a corresponding data line of a select section of the plurality of sections, based on a correspondence between a line address of the addressed data item and a corresponding one of the addresses of the stored data lines,
        the select section being the assigned section of the corresponding one of the addresses of the stored data lines.

2. The cache system of claim 1, wherein
the cache system is further configured
> to store a current data line corresponding to the line address of the addressed data item from a memory to a particular section of the plurality of sections, and
> to store an address corresponding to the line address, and an identification of the particular section, as one of the address entries, and assigned section, respectively.

3. The cache system of claim 2, wherein
the one of the address entries corresponds to a least recently used address entry.

4. The cache system of claim 2, wherein
the way determination table also includes a valid-field, whose state is determined based upon whether the assigned section continues to contain the current data line corresponding to the address of the stored data line.

5. The cache system of claim 1, wherein
the limited number of address entries correspond to most recently accessed line addresses.

6. The cache system of claim 1, wherein
the way determination table is embodied as a content-addressable memory.

7. The cache system of claim 1, wherein
the cache memory corresponds to an n-way associative cache, having a plurality of ways that form the plurality of sections,
each way further comprising
> a plurality of stored tags corresponding to the plurality of stored data lines,
> each of the plurality of stored data lines and the plurality of stored tags being uniquely addressable via an index field of the line address of the addressed data item,
> wherein
>> the n-way associative cache is configured
>>> to determine whether the addressed data item is located in each way of the plurality of ways, by comparing a tag field of the line address to a stored tag of the plurality of stored tags corresponding to the index field of the line address in the way, if the line address of the addressed data item does not correspond to any of the addresses of the stored data lines.

8. The cache system of claim 7, wherein
the n-way associative cache is further configured
> to load the addressed data item from a memory and into a particular way of the plurality of ways, if the addressed data item is not located in the corresponding data line in the plurality of ways, and
> to store an address corresponding to the line address of the addressed data item, and an identification of the particular section, as one of the address entries, and assigned section, respectively.

9. The cache system of claim 7, further including
a way-prediction table that is configured to provide a predicted way corresponding to the addressed data item, and
wherein
> the n-way associative cache is further configured
>> to determine whether the addressed data item is located in the predicted way of the plurality of ways, by comparing the tag field of the line address to the stored tag of the plurality of stored tags corresponding to the index field of the line address in the way, if the line address of the addressed data item does not correspond to any of the addresses of the stored data lines.

10. The cache system of claim 1, wherein
the address entry comprises a group address that corresponds to addresses of a plurality of the stored data lines.

11. A method for determining a section of a cache that contains a referenced data item, the cache containing a plurality of sections, the method comprising:
determining a line address corresponding to the referenced data item,
determining, without a tag comparison operation, whether the line address corresponds to an address of a stored data line of a plurality of addresses of stored data lines, and
if the line address corresponds to the address of the stored data line:
> providing an identifier of the section of the cache corresponding to the address of the stored data line.

12. The method of claim 11, wherein
providing the identifier of the section of the cache includes:
determining a current validity of the identifier, and
providing the identifier only if the identifier is currently valid.

13. The method of claim 11, further including:
if the line address does not correspond to any of the plurality of addresses of the stored data lines:
> determining a tag address corresponding to the referenced data item,
> determining an index address corresponding to the referenced data item,
> comparing the tag address to a tag field that is associated with the index address in each of the plurality of sections, to determine whether the referenced data item is contained in any section of the cache.

14. A processing system comprising:
a processor that is configured to access data items in a memory, and
a cache system, operably coupled to the processor and the memory, that is configured to contain a subset of the data items in the memory,
the cache system comprising:
> a cache memory comprising a plurality of sections,
> each section of the plurality of sections comprising a plurality of stored data lines corresponding to the subset of the data items, and
> a way determination table that is configured to contain a limited number of address entries corresponding to addresses of the stored data lines and an assigned section for each of the addresses of the stored data lines;
> wherein
>> the assigned section of each of the addresses of the stored data lines uniquely and unambiguously identifies the section of the cache memory that contains the stored data line, and
>> the cache system is configured
>>> to determine, without a tag comparison operation, whether an addressed data item is located in a corresponding data line of a select section of the plurality of sections, based on a correspondence between a line address of the addressed data item and a corresponding one of the addresses of the stored data lines, the select section being the assigned section of the corresponding one of the addresses of the stored data lines.

15. The processing system of claim 14, wherein the cache system is further configured to store a current data line corresponding to the line address of the addressed data item from the memory to a particular section of the plurality of sections, and to store an address corresponding to the line address, and an identification of the particular section, as one of the address entries, and assigned section, respectively.

16. The processing system of claim 15, wherein the one of the address entries corresponds to a least recently used address entry.

17. The processing system of claim 14, wherein the way determination table also includes a valid-field, whose state is determined based upon whether the assigned section continues to contain the current data line corresponding to the address of the stored data line.

18. The processing system of claim 14, wherein the limited number of addresses of the stored data lines correspond to most recently accessed line addresses.

19. The processing system of claim 14, wherein the way determination table is embodied as a content-addressable memory.

20. The processing system of claim 14, wherein the address entry comprises a group address that corresponds to addresses of a plurality of the stored data lines.

* * * * *